(12) United States Patent
Schindler

(10) Patent No.: US 6,719,904 B2
(45) Date of Patent: Apr. 13, 2004

(54) ENHANCED DISSOLVED OXYGEN GROUNDWATER REMEDIATION METHOD AND SYSTEM

(75) Inventor: A. Russell Schindler, Traverse City, MI (US)

(73) Assignee: Remediation Technologies, Inc., Traverse City, MI (US)

( * ) Notice: Subject to any disclaimer, the term of this patent is extended or adjusted under 35 U.S.C. 154(b) by 0 days.

(21) Appl. No.: 10/078,014

(22) Filed: Feb. 19, 2002

(65) Prior Publication Data

US 2002/0185451 A1 Dec. 12, 2002

Related U.S. Application Data

(60) Provisional application No. 60/296,540, filed on Jun. 6, 2001, provisional application No. 60/296,528, filed on Jun. 6, 2001, and provisional application No. 60/296,609, filed on Jun. 6, 2001.

(51) Int. Cl.[7] .................................................. C02F 3/02
(52) U.S. Cl. ...................... 210/620; 210/747; 210/170; 405/128.5; 405/128.75
(58) Field of Search ................................. 210/620, 747, 210/758, 170, 220; 405/128.45, 128.5, 128.7, 128.75, 129.2, 129.25

(56) References Cited

U.S. PATENT DOCUMENTS

| | | | | |
|---|---|---|---|---|
| 3,505,213 A | * | 4/1970 | Anthony et al. | 210/170 |
| 4,849,360 A | * | 7/1989 | Norris et al. | 210/747 |
| 5,286,141 A | | 2/1994 | Vigneri | |
| 5,480,549 A | * | 1/1996 | Looney et al. | 210/747 |
| 5,560,737 A | * | 10/1996 | Schuring et al. | 210/747 |
| 5,584,605 A | * | 12/1996 | Beard et al. | 210/747 |
| 5,623,992 A | * | 4/1997 | Shaw | 210/747 |
| 5,874,001 A | * | 2/1999 | Carter | 210/620 |
| 5,885,203 A | | 3/1999 | Pelletier | |
| 6,100,382 A | | 8/2000 | Wolfe et al. | |
| 6,155,276 A | | 12/2000 | Oglesby et al. | |
| 6,207,073 B1 | | 3/2001 | Wolfe et al. | |
| 6,210,073 B1 | * | 4/2001 | Buehlman et al. | 210/170 |
| 6,254,785 B1 | | 7/2001 | Phifer et al. | |
| 6,262,002 B1 | | 7/2001 | Carey | |
| 6,267,534 B1 | * | 7/2001 | Schwalbe | 405/128.45 |
| 6,319,882 B1 | | 11/2001 | Ivey | |
| 6,481,929 B1 | * | 11/2002 | Layton et al. | 405/128.7 |

* cited by examiner

Primary Examiner—Christopher Upton
(74) Attorney, Agent, or Firm—Artz & Artz, PC

(57) ABSTRACT

A bioremediation method and system for destroying or reducing the level of contaminants in a contaminated subterranean body of water includes a plurality of injection conduits. Each injection conduit extends below ground and intersects a body of groundwater. A plurality of bore holes are formed in which a plurality of injection conduits are disposed. Each of the injection conduits includes an injection site formed at an end thereof, which are to be located in the groundwater at predetermined locations and depths. The injection conduits and thus the plurality of injection sites are in communication with a supply of concentrated oxygen. The oxygen is conveyed by a delivery mechanism from the supply of oxygen to the injection sites.

25 Claims, 4 Drawing Sheets

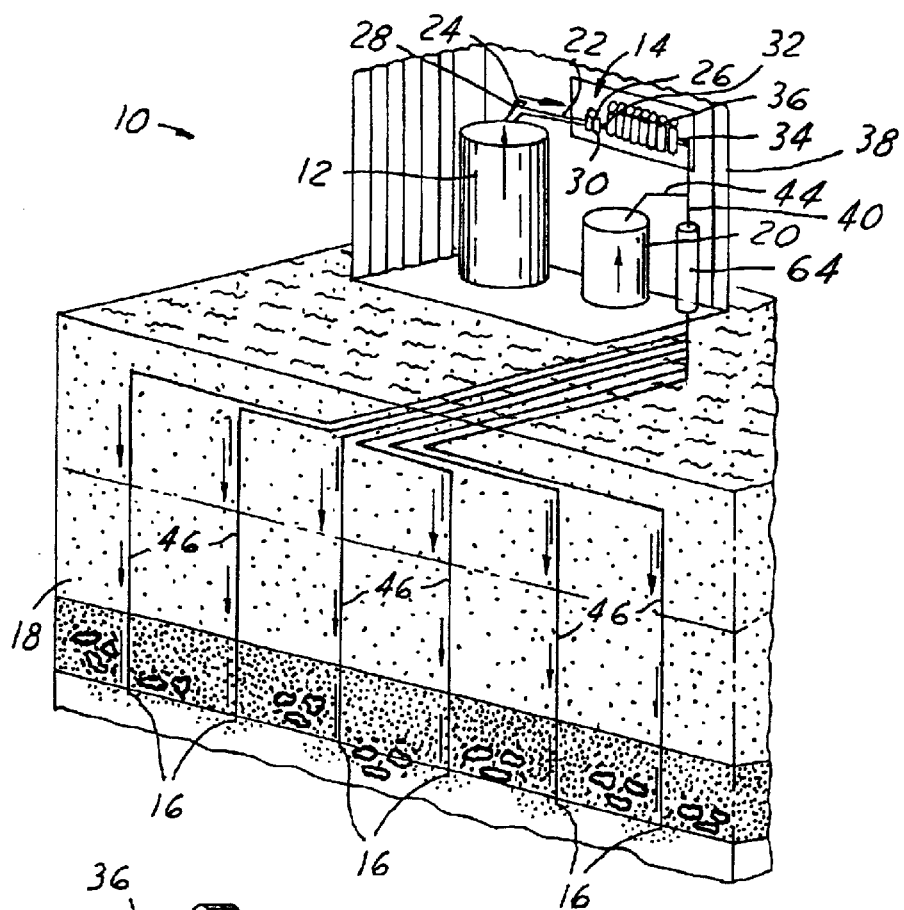
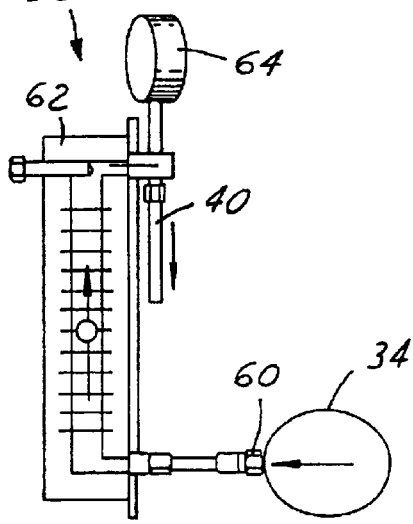
FIG.1
FIG.2
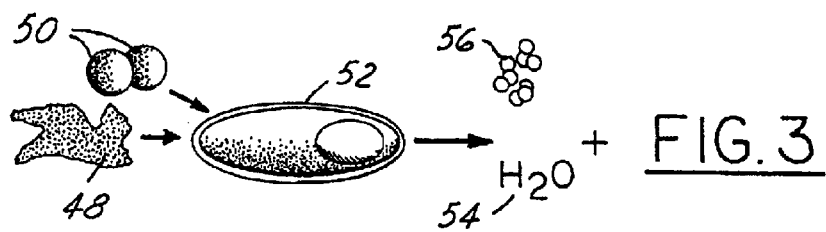
FIG.3

ENHANCED DISSOLVED OXYGEN GROUNDWATER REMEDIATION METHOD AND SYSTEM

CROSS-REFERENCE TO RELATED APPLICATIONS

The present invention claims priority from U.S. Provisional Application No. 60/296,540, entitled "Direct Oxygen Injection Technology Systems", filed Jun. 6, 2001, U.S. Provisional Application Ser. No. 60/296,528, entitled "Enhanced Dissolved Oxygen Technology Systems", filed Jun. 6, 2001, U.S. Provisional Application Ser. No. 60/296,609, entitled "Multi-Arrayed Vacuum Recovery Systems", filed Jun. 6, 2001.

TECHNICAL FIELD

The present invention relates generally to a method and system for reducing the level of contaminants in a body of groundwater and more particularly to a bioremediation method and system for groundwater treatment with minimal site disruption.

BACKGROUND ART

Groundwater contamination, typically arising from petroleum storage tank spills or from intentional or accidental discharge of liquid hydrocarbons or compositions containing same, has become a problem of increasing concern. This type of contamination occurs not only at industrial complexes, but also in suburban neighborhoods, which would appear to be havens from such phenomena. The source of contamination in suburban neighborhoods or areas is very commonly automobile service station sites at which antiquated or abandoned storage tanks have released gasoline, fuel oils, lubricants, and the like into the local groundwater. Other common sources of such noxious materials can include dry cleaning establishments and/or manufacturers or distributors of the tetrachloroethane which is used in the dry cleaning process.

Various remediation techniques have been utilized in the past for the treatment of contaminated groundwater in order to reduce or eliminate the contaminants, such as COCs. One of the most widely used systems is one based on so-called "pump and treat" technology. These systems withdraw the contaminated groundwater and a phase-separated product from a recovery well located in the groundwater and pump it to an above-ground treatment facility. Thereafter, various treatment techniques, as are well known, are used to remove contaminants from the displaced groundwater. These "pump and treat" systems are relatively expensive to install and require that the remaining contaminants, which have been separated from the groundwater, be disposed of in an environmentally friendly manner. These processes further increase the cost of the techniques.

One example of a known remediation system is disclosed in U.S. Pat. No. 5,286,141. The '141 patent teaches oxidizing the source of groundwater contamination to harmless constituents by locating a plurality of mutually spaced wells into a groundwater region. A treating flow of hydrogen peroxide solution is provided into the groundwater from one or more wells. The treating flow typically contains reaction surface enhancing reagents, which provide increased surfaces at which the reaction between the hydrogen peroxide and the hydrocarbon contaminants may occur. Further, a catalytic agent is also preferably incorporated into the treating solution or as a pre-injection into the groundwater region to promote the desired reaction between the hydrogen peroxide and hydrocarbons.

Recently, there has also been increasing interest in bioremediation technology. However, its use in treating groundwater has been relatively ineffective due to the complexity of the procedures and equipment required, including expensive and complex reactors. Moreover, current bioremediation techniques can cause adverse geochemical reactions and can introduce new toxic compounds into the groundwater. Additionally, current bioremediation systems, still require the use of non-organic catalysts or additives to cause the process to be completed in a reasonable period of time. These catalysts or additives raise other contaminant issues with respect to the groundwater.

It is known that naturally growing bacteria in the groundwater can break down groundwater contaminants. However, these bacteria are not always present in large enough quantities to be effective and can also be absent altogether. Moreover, these bacteria feed off oxygen and the lack of oxygen is the single biggest limiting factor on the growth of the bacterial population and therefore contaminant decrease. Ambient air, which is comprised of about 21% percent oxygen, only results in approximately 10–12 ppm of dissolved oxygen in the groundwater and thus is not sufficient to adequately destroy or reduce contaminants. Various attempts to increase the amount of oxygen by utilizing oxygen releasing compounds have been tried, but these oxygen releasing compounds, such as magnesium peroxide or calcium peroxide are expensive. Further, these oxygen releasing compounds only produce a small amount of usable oxygen and therefore do not significantly increase the bacterial population.

SUMMARY OF THE INVENTION

It is therefore an object of the present invention to provide a bioremediation method and system for groundwater treatment that is more effective than prior bioremediation systems.

It is another object of the present invention to provide a bioremediation method and system for groundwater treatment that is less expensive than prior bioremediation systems.

It is still another object of the present invention to provide a bioremediation method and system for groundwater treatment that treats contamination naturally and effectively.

It is still another object of the present invention to provide a bioremediation system that is relatively easy and inexpensive to install and operate.

It is a related object of the present invention to provide a bioremediation system that can be installed with minimal site disturbance or disruption.

In accordance with the above and other objects of the present invention a bioremediation method and system is provided. The method includes providing a plurality of injection conduits extending from above ground to a subterranean body of groundwater. Each of the injection conduits has an injection point disposed thereon. A plurality of injection conduits are grouped to enter the ground at a single location and fan out below ground to different predetermined locations within the body of groundwater. A source of substantially pure oxygen is provided and placed in communication with the plurality of injection conduits and thus the associated injection points in order to dispense oxygen vapor therethrough and into the groundwater. The oxygen is delivered to the plurality of injection points and into the subterranean body of groundwater until the level of contaminants in the groundwater is reduced or eliminated. Additionally, a supply of microbials can also be injected into the groundwater to further promote the reduction of the level of contaminants.

The system of the present invention includes a plurality of injection conduits each having an injection point formed therealong. The plurality of injection conduits extend below ground through a single ground hole and fan out below ground in a non-vertical fashion such that the plurality of injection points intersect a body of groundwater at a respective predetermined location. The system also includes a supply of concentrated oxygen which is delivered to the plurality of injection points and into the groundwater through each of the plurality of injection conduits. The plurality of injection conduits are in communication with a control panel to regulate the flow of oxygen thereto. The plurality of injection conduits enter the ground adjacent the control panel through a hole and extend to different points within the body of groundwater due to the varying lengths of each of the injection conduits.

The above objects and other objects, features and advantages of the present invention will be apparent from the following detailed description of best made for carrying out the invention to be taken in connection with the accompanying drawings and appended claim.

BRIEF DESCRIPTION OF THE DRAWINGS

FIG. 1 is a schematic illustration of an enhanced dissolved oxygen groundwater bioremediation system in accordance with a preferred embodiment of the present invention;

FIG. 2 is a schematic illustration of the breakdown of contaminants in accordance with the present invention;

FIG. 3 is an illustration of a flow meter for use with the preferred system in accordance with a preferred embodiment of the present invention;

DETAILED DESCRIPTION OF THE PREFERRED EMBODIMENT

Figure 4A:
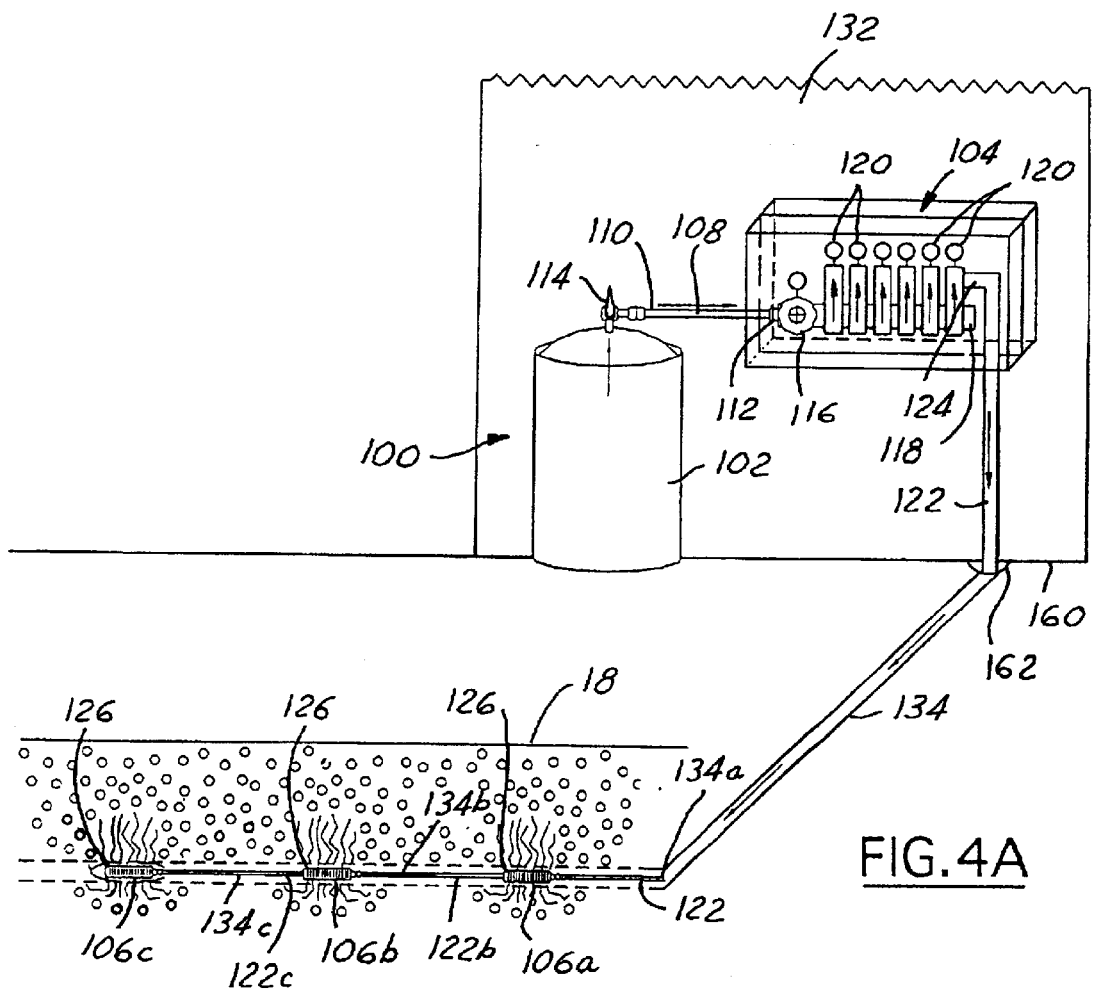
FIG. 4A is a schematic illustration of a dissolved oxygen groundwater bioremediation system in accordance with another preferred embodiment of the present invention.

Referring now to FIG. 1 which illustrates a bioremediation system 10 in accordance with the present invention. The preferred bioremediation system 10 is preferably used to clean up biodegradable petroleum constituents that are present in contaminated groundwater. However, it should be understood, that the system 10 can be used to clean up other contaminates or constituents in groundwater and that the system may be used for a variety of other purposes. For example, the system 10 may also be used to assist in cleaning up contaminants that may present in ground soil.

The preferred bioremediation system 10 preferably includes a source of oxygen 12, such as a liquid oxygen tank. However, the oxygen can be provided in a variety of other forms. While the source of oxygen is preferably pure, it need only be of sufficient purity to accomplish the objectives of the present invention. For example, a source of oxygen that has over 50% oxygen may also be sufficient. The source of oxygen 12 is preferably in communication with a control panel 14 to regulate the flow of oxygen, in vapor form, from the oxygen source 12. The oxygen that flows to the control panel 14 is then conveyed to a plurality of injection sites 16 in a subterranean body of groundwater, generally indicated by reference number 18. The plurality of injection sites 16 can also be placed in communication with a supply of microbials 20. The location of the injection sites 16 can be determined in a variety of ways, as discussed below.

The source of oxygen 12 is preferably coupled to the control panel 14 by a pressure hose 22 in order to convey the oxygen in vapor form thereto. The pressure hose 22 has a first end 24 that is connected to the source of oxygen 12 and a second end 26 that is connected to the control panel 14. The source of oxygen 12 has a shut off valve 28 associated therewith, which is located between the source of oxygen 12 and the first end 24 of the pressure hose 22. The shut off valve 28 allows the flow of oxygen in vapor form from the source of oxygen 12 to the pressure hose 22 to be manually closed as desired. It should be understood that the valve 28 can also be electronically controlled to regulate the flow of oxygen from the source of oxygen 12.

The second end 26 of the pressure hose 22 is preferably connected to a pressure regulator 30 which allows the pressure of oxygen exiting the source of oxygen 12 to be controlled. In the preferred embodiment, the pressure regulator 30 is set such that the pressure of oxygen exiting the oxygen source 12 is set for example, at 100 psi. It should be understood that the pressure regulator 30 can be adjusted to regulate the flow of oxygen to a variety of different pressures.

The oxygen that exits the pressure regulator 30 enters a first conduit 32, which conveys the pressure regulated oxygen to an oxygen header pipe 34. The oxygen header pipe 34 has a plurality of flow meters 36 connected thereto and which are in fluid communication therewith to receive the pressure regulated oxygen. The pressure regulator 30, the first conduit 32, the oxygen header pipe 34, and the plurality of flow meters 36 are all preferably disposed within the control panel 14. The control panel 14 is preferably mounted to a fence, wall or other structure 38. However, more or less items may be included in the control panel 14 and the control panel 14 can be located in a variety of suitable locations. The flow meters 36 (shown best in FIG. 3) regulate the flow of oxygen from the header pipe 34 to a respective outlet conduit 40. In other words, each flow meter 36 is in communication with a respective outlet conduit 40.

In one preferred embodiment, the outlet conduits 40 are also in communication with the source of microbials 20 through a microbial outlet tube 44. The microbials 20 exit the source 42 and pass through the microbial outlet tube 44 and enter each of the outlet conduits 40. Preferably, the microbials 20 are injected initially prior to injection of the oxygen. The amount of microbials is preferably determined based on the size of the contaminated area. Thereafter, the microbials will reproduce as appropriate for the amount of food and oxygen present in the groundwater.

Each of the outlet conduits 40 is in communication with a respective injection conduit 46. While FIG. 1 only shows a single outlet conduit 40, it will be appreciated that each injection conduit 46 is directly connected to a separate outlet conduit 40, which is in communication with a respective flow meter. Each of the injection conduits 46 terminates at a respective one of the plurality of injection sites or points 16. Accordingly, the number of flow meters 36 that are utilized in a particular system will depend upon the number of injection sites 16 that are determined to be necessary to clean up the groundwater at a given location. Similarly, the number of outlet conduits 40 and the number of injection conduits 46 will depend upon the number of injection sites 16 that are determined to be necessary to clean up a body of groundwater. Thus, each injection site 16 has an injection conduit 46, an outlet conduit 40, and a flow meter 36 associated therewith to regulate the flow of oxygen to that injection site 16. The conduits, pipes, tubes, and injection points are preferably constructed of PVC piping. The outlet conduits 40 are preferably ¼–⅜ inch tubing and the injection conduits 46 are preferably ½ inch tubing. The size and material of the pipes and conduits can obviously vary.

Referring now to FIG. 2, which illustrates the desired chemical reaction induced in the groundwater by the preferred bioremediation system 10. As shown, when a body of groundwater needs remediation, contaminants are present in the groundwater 18, as generally indicated by reference number 48. Oxygen molecules, as generally indicated by reference number 50, are fed to a microbial, which is generally indicated by reference number 52. The microbial 52 feeds off the oxygen molecules 50 and breaks down the contaminants 48 into a combination of water, as generally indicated by reference number 54, and carbon dioxide, as generally indicated by reference number 56. It will be understood that the contaminants are typically a COC chain, but could be a variety of other contaminants that require removal.

Figure 5A:
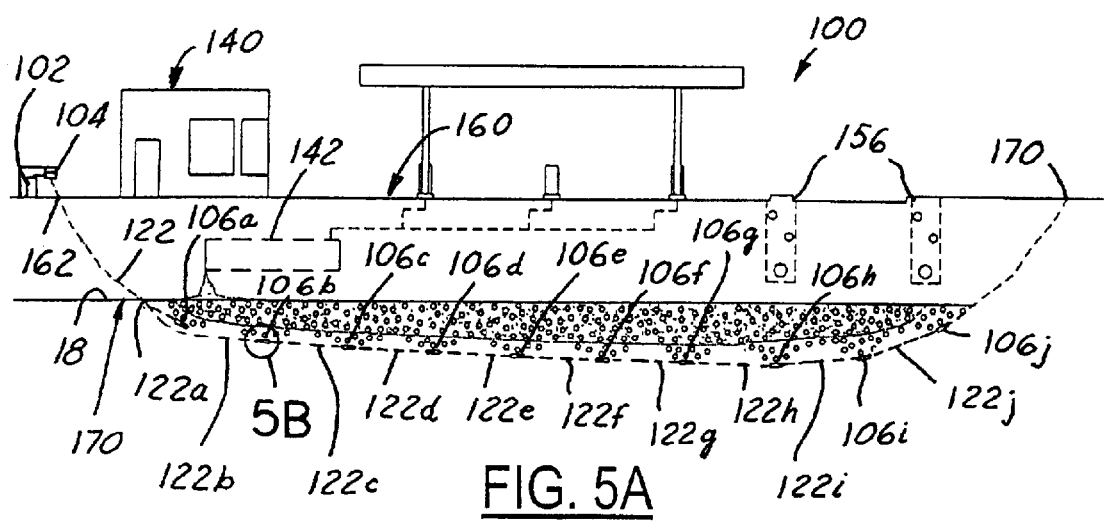
FIG. 5A is a schematic cross-sectional illustration of an exemplary dissolved oxygen groundwater bioremediation system installation in accordance with another preferred embodiment of the present invention.
Figure 6:
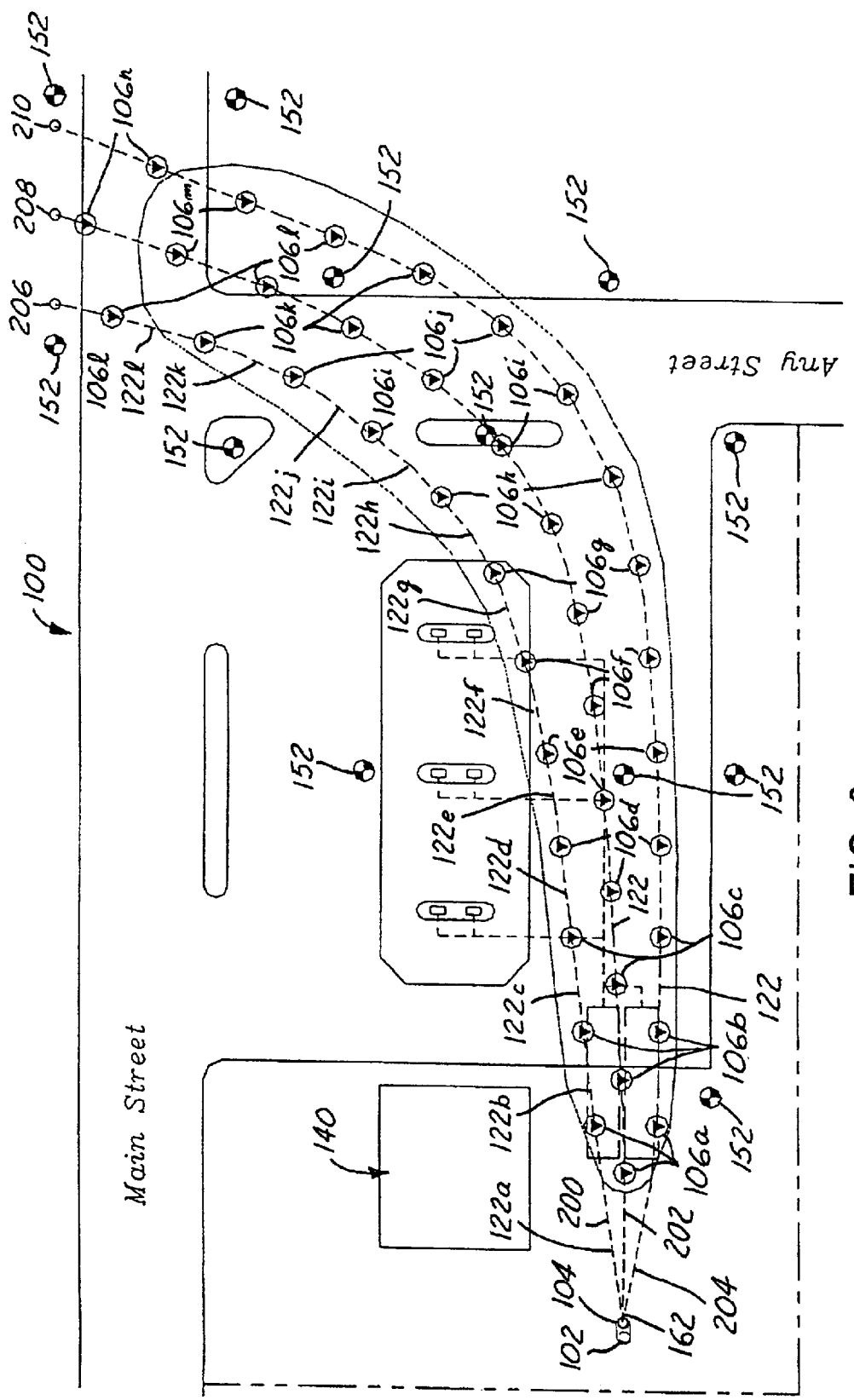
FIG. 6 is a schematic plan view of a dissolved oxygen groundwater bioremediation system in accordance with another preferred embodiment of the present invention.

The system 10 is preferably installed at a site that was formerly a service station (as shown in FIGS. 5A and 6) that has been determined to have groundwater, which is contaminated with petroleum, whether through accidental or intentional spillage. As is known, the groundwater can be tested through the use of a monitoring well to determine whether or not the groundwater has been contaminated. In accordance with the present invention, one way for determining the existence of contaminants is the absence or depletion of oxygen, which indicates that naturally existing bacteria are feeding on the oxygen in an effort to breakdown the contaminants. It can be assumed that a body of groundwater has unacceptable levels of contamination when the percentage of oxygen in soil gas in the vadose zone just above the groundwater interface, is less than approximately 21% oxygen and less than the oxygen levels in the vadose zone just above the groundwater interface, at nearby locations with similar soil conditions, that are known to be uncontaminated.

It can also be assumed that a body of groundwater has unacceptable levels of contamination when the percentage of carbon dioxide in soil gas in the vadose zone, just above the groundwater interface, is greater than 0.5 percent and greater than carbon dioxide levels in soil gas in the vadose zone just above the ground water interface at nearby locations with similar soil conditions that are known to be uncontaminated.

When these two situations occur simultaneously (that is, the depleted oxygen environment along the with elevated carbon dioxide environment) it is because there exists a population of bacteria consuming contamination along with available oxygen and respiring carbon dioxide. This assumption is further enhanced when at a location nearby with similar soil conditions, that is known to be uncontaminated, oxygen levels are significantly higher than at locations within the contaminated zone and carbon dioxide levels are significantly lower than at locations within the contaminated zone. One must be careful to assure comparisons of locations based proximity, similar soil types, and site conditions.

Once it has been determined that the groundwater is contaminated, in accordance with the present invention, the location of the injection points or sites can be determined. The location of the injection points can be determined in a variety of different methods. Preferably, however, the injection points are located in a grid that takes into account the direction and flow rate of groundwater flow. By taking into account the groundwater flow, injection sites will be positioned to prevent contaminants from spreading. Typical grid determination is based on site specifics, but generally, a grid is based on a determination of two months of groundwater flow (e.g. if the groundwater flows 120 feet per year, the grid would be a 20 foot grid). A grid pattern is preferred as it helps insure proper spacing between the injection sites and consistent oxygen levels in both the vadose zone and in migrating groundwater.

A plurality of monitoring wells are preferably utilized to determine the extent and location of any contaminants so that the system usage can be maximized. Obviously, any number of monitoring wells can be included. The injection sites 16 are preferably located in a grid pattern as shown (i.e. columns and rows), and then the injection conduits 46, which are connected to the source of oxygen 12 and the control panel 14 and also the source of microbials 42 are installed in order to inject the oxygen, preferably in vapor form, into the groundwater at each of the injection sites 16. As set forth above, the injected oxygen is preferably pure, but need only have sufficient purity to accomplish the objects of the invention, as discussed above.

Once the system 10 is installed, the oxygen vapor is regulated and metered to be delivered into the groundwater at a predetermined rate. The rate is preferably adjusted over time. The dissolved oxygen in the groundwater and the amount of oxygen in the soil gas vapor are monitored to assure a sufficient flow of oxygen to the injection sites 16. Similarly, the oxygen is monitored to determine if too much oxygen is being added in order to prevent undue waste of oxygen and thereby increase expense. In accordance with the present invention, it has been determined through testing that the preferred level of oxygen in the soil gas vapor is in the range of about approximately 15% to 25%. More preferably, the level of oxygen in the soil gas vapor is approximately 21%. It will be understood that the level of oxygen in the soil gas vapor can vary. For example, it can be higher than 25%, even though it is believed that levels above 25% can be inefficient. Moreover, it can also be lower than 15% depending upon the application. The level of oxygen in the soil gas vapor can be determined through soil gas monitoring and testing techniques, as are known in the art.

The level of oxygen in the soil gas vapor can be controlled by regulating the flow of oxygen to each of the injection sites 16 through their associated flow meters 34. If not enough oxygen is injected into the groundwater, i.e., the level of oxygen in the soil gas vapor is significantly less than 15%, the remediation process will not occur any faster than it would naturally. If too much oxygen is injected, the remediation process will not occur any faster than it would with the preferred levels of oxygen. Obviously, the flow rate and pressure of the oxygen vapor to the injection sites 16 can be varied as needed to increase or decrease the flow rate of oxygen. The effect of the system on the contaminants can be monitored periodically through the monitoring wells. Further, if the source of oxygen 12 becomes depleted, it can be easily replaced without disrupting the clean up process. Additionally, if the source of microbials 12 becomes depleted, it can also be easily replaced without disrupting the remediation process.

The preferred system is relatively inexpensive to install as it costs significantly less than prior systems. Moreover, the system operates twenty-four hours a day and requires no electricity or maintenance to operate. Further, as there are no moving parts, there is nothing to lube, oil or grease. The system is also less susceptible to break down.

It has been determined that pure oxygen works to clean up contaminants in a body of groundwater more efficiently than ambient air and more efficiently and at less cost than various oxygen releasing compounds. By increasing the amount of dissolved oxygen, it has been found that the bacterial population increases by over a magnitude of a thousand. However, if the bacterial population is too small or nonexistent, it needs to be enhanced for the pure oxygen to work effectively. The issue thus becomes how to deliver the pure oxygen and the microbials into the ground and into communication with the groundwater. In accordance with the present invention, the preferred way is through the delivery system described herein. Moreover, other delivery systems for conveying the oxygen and microbials to the injection sites may also be utilized.

As discussed above, in the preferred embodiment, a plurality of injection conduits 46 are utilized to convey the pure oxygen from the source of oxygen 12 and microbials from the source 42 to the injection sites 16. While the source of oxygen 12 is preferably initially in liquid form, the pressure in the source 12 causes the liquid to turn to vapor. It is the pure oxygen vapor that is captured and then delivered through the delivery system and reacts with the microbials. The injection points 16 and the injection conduits 46 can be installed by any of a variety of methods, including by typical hollow stem auger with sand backfill. This is primarily for sites interbedded with clays, sands, and the like. Alternatively, the injection conduits 46 may be installed by known GeoProbe® (GeoProbe is a registered trademark of KEJR Engineering, Inc. of Kansas) installation techniques.

In accordance with the above-described system, the injection conduits 46 are preferably installed by airjet injection. Airjet injection is a novel installation technique that is part of the present invention. In accordance with the present invention, airjet injection utilizes a compressor that is connected to an injection conduit 46 via a hose. The air flow and pressure from the compressor act as a cutting tool allowing injection conduit 46 to be "injected" or inserted into the ground with minimal site description and with minimal time and capital expense. It has been determined that up to eighty (80) or more injection points can be installed in a single day. This is significantly higher than the number of points that could be installed under prior installation methods.

As shown in more detail in FIG. 3, each flow meter 36 is preferably connected to the oxygen header pipe 34 by a compression fitting 60 that allows oxygen at the regulated pressure to be delivered thereto. Each flow meter 36 is preferably mounted to a mounting board 62 or other structure in the control panel 14 and includes a pressure indicator 64 that provides a visual indication of the pressure of vapor, such as oxygen, flowing therethrough. The outlet conduits 40 that are in communication with the outlet of the flow meters 36 preferably extend through a protective tube 66 (FIG. 1), which extends from the control panel 14 into the ground. The protective tube 66 acts to shield and protect the outlet conduits 40. The outlet conduits 40 are preferably located at least one foot below the ground and run generally parallel thereto. The injection conduits 46 are in communication with a respective one of the outlet conduits 40 and extend generally perpendicularly downward from the respective outlet conduit 40 and into communication with the groundwater. As shown, the injection conduits 46 intersect the groundwater 18 and terminate below the water table at designated injection sites 16 in order to deliver the pure oxygen and, if desired, the microbials thereto.

Referring now to FIGS. 4 through 6, which illustrate another embodiment of a groundwater remediation method and system in accordance with the preferred embodiment. The groundwater remediation system 100 shown in FIGS. 4 through 6 preferably operates in accordance with the same principles discussed above in connection with FIGS. 1 and 3 and is preferably utilized for the same purposes, namely to clean up contaminants or constituents in groundwater or surrounding ground soil. However, the system 100 is configured and installed somewhat differently, as described in detail below.

Figure 4B:
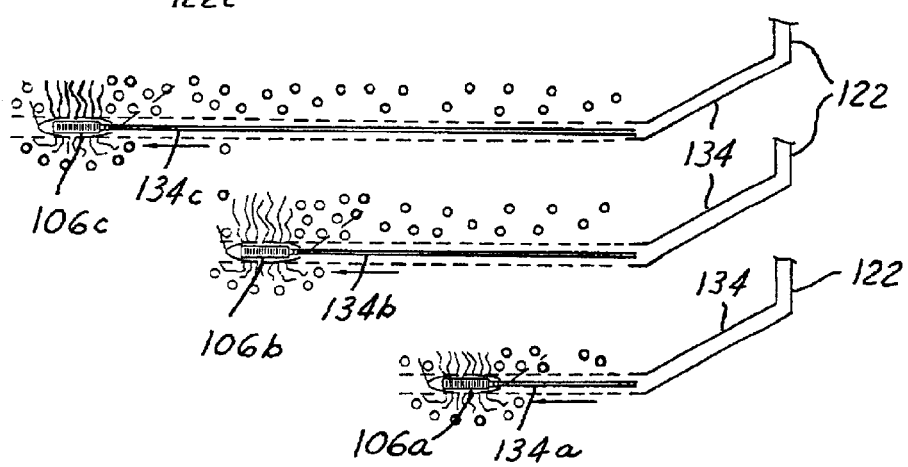
FIG. 4B is a schematic top view illustrating a plurality of injection sites in accordance with the system of FIG. 4A.

Referring now to FIGS. 4A and 4B, the preferred bioremediation system 100 includes a source of oxygen 102 such as a liquid oxygen tank. Like the source of oxygen 12, the source of oxygen 102 can be provided in a variety of forms and purities or compositions. The source of oxygen 102 is in communication with the control panel 104 to regulate the flow of oxygen thereto. The oxygen that flows to the control panel 104 is then conveyed to a plurality of injection sites 106 in a subterranean body of groundwater, generally indicated by reference number 18 as is discussed in more detail below. The plurality of injections sites 106 may also be in communication with a supply of microbials, as discussed in detail above. Moreover, the location of the injection sites 106 can be determined in a variety of ways, as discussed above.

The source of oxygen 102 is preferably coupled to the control panel 104 by a pressure hose 108. The pressure hose 108 has a first end 110 that is connected to the source of oxygen 102 and a second end 112 that is connected to the control panel 104. The source of oxygen 102 has a shut off valve 114 associated therewith, which is located between the source of oxygen 102 and the first end 110 of the pressure hose 108. The shut off valve 114 allows the flow of oxygen from the source of oxygen 102 to be manually closed as desired. Alternatively, the valve 114 can be electronically actuated. The second end 112 of the pressure hose 108 is preferably connected to a pressure regulator 116 which allows the pressure of oxygen vapor exiting the source of oxygen 102 to be controlled, in a manner similar to that discussed above.

The oxygen that exists the pressure regulator 116 enters a header pipe 118. The oxygen header pipe 118 has a plurality of flow meters 120 connected thereto and which are in fluid communication therewith. The configuration of the preferred flow meters 120 is preferably the same as the flow meters 36 shown and discussed in detail above in connection with FIG. 3. The pressure regulator 116, the oxygen header pipe 118, and the plurality of flow meters 120 are all preferably disposed within the control panel 104 which may be mounted to a fence, wall or other structure 132. However, more or less items may be included in the control panel 104 and the control panel 104 can be located in a variety of other suitable locations.

Figure 5B:
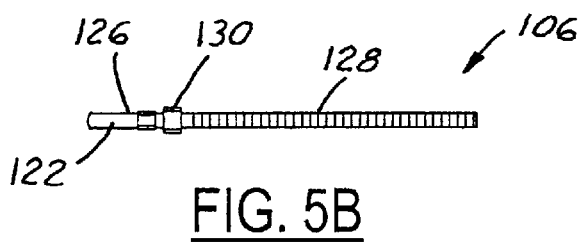
FIG. 5B is an illustration of an injection point in the circle labeled 5B in FIG. 5A.

Each of the flow meters 120 is in communication with a respective injection conduit 122. While only a single injection conduit 122 is shown, it will be appreciated that a separate injection conduit 122 is attached to each flow meter 120. Each injection conduit 122 has a first end 124 that is in communication with a respective flow meter 120 and a second end 126 which is disposed remotely from the first end 124. Each injection conduit 122 has an injection site 106 formed adjacent its second end 126. Each of the plurality of injection sites 106, as shown in FIG. 5B, preferably includes a screened portion 128 that is coupled by a compression fitting 130 to the tubing which makes up each of the injection conduits 122. Alternatively, the injection site 106 can be a plurality of holes or openings formed in the conduits, such as by a manual punch process or the like. However, the openings may be formed in the injection conduits 122 by a variety of other methods.

As shown in FIGS. 4A and 4B, each injection conduit 122a, 122b, 122c has a middle portion 134a, 134b, 134c that extends between the first end 124 and the second end 126. Each middle portion 134a, 134b, 134c is disposed below the ground surface and intersects the groundwater 18. The plurality of injection sites 106a, 106b, 106c are thus positioned such that they intersect and are preferably disposed within the groundwater 18. Each of the middle portions 134a, 134b, 134c, is preferably oriented in a generally non-vertical manner with respect to the ground. As used herein, non-vertical does not require parallelism of the conduit to the ground. Instead, it only requires that the first end 124 of each of the injection conduits 122 extend from above ground and into communication with the upper surface of the groundwater with the middle portion 134 fanning out beneath the surface of the groundwater in a non-vertical fashion. In other words, the injection site 106 is not located directly below the location where the middle portion 134 intersects the surface of groundwater 18.

The injection conduits 122 are preferably grouped such that a plurality of them enter the ground surface 160 through a single hole 162. Once below the ground surface 160, each of the injection conduits 122 that extend through the hole 162 fan out such that the each of injection sites 106 is located in a different predetermined spot to provide oxygen into the water in a grid fashion, as determined in the manner set forth above. To accomplish this, each of the injection conduits 122a, 122b, 122c preferably has a different length. Each of the injection sites 106 is preferably located in generally the same horizontal plane, i.e., at the same depth below the surface of the groundwater, but it will be appreciated that they can be located in different planes, i.e., at different depths below the surface of the groundwater 18. While three injection conduits 122a, 122b, and 122c, are shown entering the ground through the hole 162 to deliver oxygen through the respective injection sites 106a, 106b, and 106c, it will be appreciated that any number of conduits 122 and injection sites 106 may be utilized. It will be understood that multiple bore holes may be formed in the ground with each receiving a respective grouping of injection conduits.

As shown in FIGS. 5A and 6, the preferred installation for the system 100 is at a location such as a former gas station 140 where contaminants have leaked from an underground storage tank 142 into a subterranean body of groundwater 144 and/or the surrounding ground soil, whether from accidental or intentional spillage. To install the system, the control panel 104 and the supply of oxygen 102 are installed above ground adjacent the body of groundwater 144. Thereafter, one or more holes 170 are bored into the ground 160 along a predetermined path such that a plurality of injection conduits 122 enter the ground at one location through the hole 162 and then fan out below ground and enter the groundwater 18.

In FIG. 5A, a single bore hole 162 is illustrated, with ten injection conduits 122a, 122b, 122c, 122d, 122e, 122f, 122g, 122h, 122i, and 122j positioned in the bore hole 170. The injection conduits 122a–j are each formed of a certain length in order to be located in the desired position of the grid. It will be understood that any number of injection conduits 122, as well as any number of groups of injection conduits 122 and bore holes, may be utilized. Each of the injection conduits 122 is preferably comprised of ¼"–⅜" polypropylene tubing with each tube having a plurality of screens 128 disposed adjacent the second end 134 thereof to form a respective injection site 106. Alternatively, instead of a screen, holes or slots can be formed in the end or sides of the conduits 122 to form the injection site 106, such as by cutting or other forming processes, as discussed in more detail above.

It will be understood that, while not shown in FIGS. 4 through 6, a supply of microbials may be included in the system and utilized in the manner set forth above. The system 100 also includes a plurality of monitoring wells 152 placed at various locations at the site of the former gas station 140 or other site. The location of the injection sites 106 is determined based on a variety of factors, including the lineal distance of the groundwell, the depth of the groundwater below the ground surface, groundwater flow and a variety of other factors, as discussed above, and will be readily understood by one of skill in the art. Thereafter, the location of the injection sites 106 and the associated injection conduits 122 can be determined. The system 100 preferably operates in the same manner discussed above in connection with the system 10.

To install the injection conduits 122, a hole is formed in the ground by boring a hole along a predetermined path by beginning at an entry location, such as the hole 162 and exiting the ground at a remote exit location 172. Obviously, other methods for forming the hole may be utilized. Once the hole is bored through the remote exit location, a plurality of injection conduits 122 are pulled into the bore hole from the exit location. The first ends 124 are then pulled out through the entry location 162. Because of the varying lengths of each of the conduits 122, the injection sites 16 are located at the appropriate predetermined location and depth within the bore hole. Once the injection conduits 122 are pulled out through the entry location 144, they are each attached to a respective flow meter 120. Obviously, the number of flow meters 120 required by the system 100 depends upon the number of injection sites 16 and thus the number of injection conduits 122.

Referring now to FIG. 6, which illustrates the installation of an exemplary system 100, whereby the injection sites are positioned in a grid format. The system includes three bore holes 200, 202, 204 which are formed as discussed above. Each bore hole begins at the entry hole and terminates at an exit hole 206, 208, 210 respectively. After the bore holes 200, 202, 204 have been formed, the injection conduits are disposed therein. Each of the injection conduits 122 in a respective bore hole 200, 202, 204 would be of a different length so as to have a different fixed injection point 106.

In the first bore hole 200, the injection conduits, identified by 122a–122l, are disposed therein. Each of the injection conduits 122a–122l has a respective injection site 106a–106l located at an end thereof. In the second bore hole 202, injection conduits 122a–122n are located. Each of the injection conduits 122a–122n has a respective injection site 106a–106n located at an end thereof. In the third bore hole 204, injection conduits 122a–122n are located. Each of the injection conduits 122a–122n has a respective injection site 106a–106n located at an end thereof. As will be understood, the lengths of the conduits are preferably calculated so that the injection points are located in the groundwater and replicate the grid pattern as discussed above. Obviously, the number of bore holes can vary as required, and the number of injection sites in a given bore hole can also vary.

The bore holes are formed beneath any UST systems and utilities 156. Once the injection conduits 122 are attached to the control panel 104 and the supply of oxygen 102, the supply of oxygen 102 is turned on and the system 100 is then operational. Through the use of the above described system with bore holes that are configured in a non-vertical manner, and preferably in a generally horizontal fashion, minimal site disruption is achieved. For example, in the exemplary illustration of FIG. 6, only four holes are formed in the ground surface 162, 206, 208, 210. Conversely, in the embodiment, shown in FIG. 1, increased site disruption is present. For example, a hole is formed where each of the outlet conduits 40 enter the ground. Additionally, holes are formed where each of the injection conduits 46 are vertically installed. This highlights the advantages of the non-vertical injection conduit configuration.

While particular embodiments of the invention have been shown and described, numerous variations and alternate embodiments will occur to those skilled in the art. Accordingly, it is intended that the invention be limited only in terms of the appended claims.

What is claimed is:

1. A system for remediating a contaminated subterranean body of groundwater, comprising:
   a supply of concentrated oxygen;
   a control mechanism for controlling the release of oxygen from said supply of concentrated oxygen;
   a plurality of injection conduits in communication with said control mechanism and extending below ground through a single entry hole, said plurality of injection conduits extending in a non-vertical fashion as they extend below a surface of groundwater; and
   a plurality of injection sites formed adjacent an end of each of said plurality of injection conduits to release oxygen from said supply of concentrated oxygen into the groundwater.

2. The system of claim 1, wherein said plurality of injection conduits are positioned in a first bore hole and each have a different length.

3. The system of claim 2, wherein said entry hole for said first bore hole is located adjacent said control mechanism and said first bore hole has an exit point located remotely from said entry hole.

4. The system of claim 2, further comprising:
   a plurality of bore holes, with each of said plurality of bore holes having a plurality of injection conduits located therein.

5. The system of claim 1, wherein each of said plurality of injection sites is comprised of an expendable screen coupled to an end of a respective one of said plurality of injection conduits.

6. The system of claim 1, wherein each of said plurality of injection sites is comprised of one or more holes formed adjacent an end of a respective one of said plurality of injection conduits.

7. The system of claim 1, further comprising:
   a supply of microbials in communication with said plurality of injection conduits to release said microbials into said groundwater through a respective one of a said injection sites.

8. The system of claim 1, wherein said control mechanism is interposed between said supply of concentrated oxygen and said plurality of injection conduits, said control mechanism regulating the flow of oxygen to said plurality injection conduits.

9. The system of claim 8, wherein said control mechanism includes a plurality of flow meters with each of said plurality of injection conduits being in communication with a separate one of said plurality of flow meters in communication therewith.

10. A method for remediating a contaminated subterranean body of groundwater to destroy or reduce contaminants comprising:
    determining a location for a plurality of injection sites in the body of groundwater;
    boring a first hole in ground having an entry point and an exit point located remotely from said entry point;
    inserting a plurality of injection conduits each having a respective injection site formed thereon into said first bore hole and in communication with the body of groundwater, such that said plurality of injection sites are positioned in said determined location; and
    delivering substantially pure oxygen to said at least one injection conduit and said plurality of injection sites.

11. The method of claim 10, further comprising:
    regulating the flow of said substantially pure oxygen to said plurality of injection sites, such that the level of oxygen in the soil gas vapor is between a range of approximately 15% and 25%.

12. The method of claim 10 further comprising:
    inserting a plurality of injection conduits each having a different length into said first bored hole.

13. The method of claim 10, wherein said substantially pure oxygen is delivered to said plurality of injection conduits and thus said plurality of injection sites from a supply of liquid oxygen.

14. The method of claim 10, further comprising:
    delivering an amount of microbials to said plurality of injection conduits and said plurality of injection sites located thereon and into the body of groundwater to assist in reducing the level of contaminants.

15. The method of claim 10, further comprising:
    forming a plurality of bore holes; and
    locating a plurality of injection conduits having a respective injection site located at an end thereof into each of said plurality of bore holes.

16. The method of claim 10, wherein the step of inserting said plurality of injection conduits includes pulling said injection conduits from said exit point through said first bore hole and out said entry point.

17. A method for remediating a contaminated groundwell, including a subterranean body of water, comprising:
    providing a supply of oxygen;
    conveying oxygen from said supply of oxygen to a control mechanism;
    providing a plurality of injection conduits each having a first end in communication with said control mechanism, a middle portion extending below ground through a single entry hole and terminating at an injection site in communication with the body of groundwater, said injection site being located remotely in a horizontal direction from said first end;

locating said injection sites of each of said plurality of injection conduits at predetermined locations in the body of groundwater; and delivering oxygen from said control mechanism to said plurality of injection sites.

18. The method of claim 17, further comprising:

regulating the flow rate of oxygen injected from said control mechanism to said plurality of injection conduits.

19. The method of claim 18, further comprising:

monitoring the level of oxygen in the soil gas vapor; and maintaining said level of oxygen in a range between about 15% and 25%.

20. The method of claim 17, further comprising:

regulating the pressure of oxygen as it is conveyed to said control mechanism.

21. The method of claim 17, further comprising:

providing a mechanism to monitor the levels of contaminants contained in the body of groundwater before and during the remediating process.

22. The method of claim 17, further comprising:

determining the location for said plurality of injection sites; and boring a hole along a path where said injection sites are to be located.

23. The method of claim 22, further comprising:

inserting said plurality of injection conduits into said bored hole.

24. The method of claim 17, further comprising:

boring a plurality of holes along a respective plurality of paths where associated injections sites are to be located; and inserting a plurality of injection conduits into each of said plurality of holes.

25. The method of claim 24, wherein each of said plurality of bore holes enter ground through the same entry hole.

* * * * *